(12) United States Patent
Swider et al.

(10) Patent No.: US 11,127,177 B2
(45) Date of Patent: *Sep. 21, 2021

(54) TECHNOLOGY FOR GENERATING PRODUCT DESIGNS USING MULTIPLE CANVASES

(71) Applicant: CIMPRESS SCHWEIZ GMBH, Winterthur (CH)

(72) Inventors: Nicholas Richard Swider, Waltham, MA (US); Edward James Hammond, Waltham, MA (US); Christina Kayastha, Cambridge, MA (US); Donald J. Naylor, Marblehead, MA (US); Christopher Wai-Lung Kwan, Newton, MA (US); Brian Robert Chitester, Jamaica Plain, MA (US)

(73) Assignee: CIMPRESS SCHWEIZ GMBH, Winterthur (CH)

( * ) Notice: Subject to any disclaimer, the term of this patent is extended or adjusted under 35 U.S.C. 154(b) by 3 days.

This patent is subject to a terminal disclaimer.

(21) Appl. No.: 16/906,073

(22) Filed: Jun. 19, 2020

(65) Prior Publication Data

US 2020/0320759 A1 Oct. 8, 2020

Related U.S. Application Data

(63) Continuation of application No. 16/172,317, filed on Oct. 26, 2018, now Pat. No. 10,726,592.

(51) Int. Cl.
*G06T 11/40* (2006.01)
*G06F 3/0484* (2013.01)
*G06T 11/60* (2006.01)

(52) U.S. Cl.
CPC .......... *G06T 11/40* (2013.01); *G06F 3/04845* (2013.01); *G06T 11/60* (2013.01)

(58) Field of Classification Search
None
See application file for complete search history.

(56) References Cited

U.S. PATENT DOCUMENTS

| 2007/0118818 | A1* | 5/2007 | Gunderson | G06F 9/543 715/838 |
| 2010/0201634 | A1* | 8/2010 | Coddington | G06F 3/04883 345/173 |
| 2014/0108974 | A1* | 4/2014 | Hoyer | G06T 19/00 715/764 |

OTHER PUBLICATIONS

Business Card Maker & Creator (YouTube Video, published on Sep. 12, 2016, URL: Business Card Maker & Creator—How to use , https://www.youtube.com/watch?v=5dJmIw9DCsw) (Year: 2016).*

(Continued)

*Primary Examiner* — Nurun N Flora
(74) *Attorney, Agent, or Firm* — Marshall, Gerstein & Borun LLP

(57) ABSTRACT

Systems and methods for facilitating product design by an electronic device are described. According to certain aspects, an electronic device may display one or more designable canvases of a user interface for editing the visual design of a product. The electronic device may display an extended workspace canvas adjacent to and at least partially surrounding the one or more designable canvases. The extended workspace canvas may be configured to display a plurality of design elements that can be reached directly from the one or more designable canvases for use. Each of the design elements may be configured to be selectively positioned within the one or more designable canvases. The electronic device may, in response to a surface change selection of the one or more designable canvases, maintain the displaying of the extended workspace canvas while the one or more designable canvases are in a transitioning state.

20 Claims, 13 Drawing Sheets

(56) References Cited

OTHER PUBLICATIONS

The Renaissance of Design Happening Right Here with DaVinci, downloaded from the Internet at: <https://web.archive.org/web/20150517001138/https:/davinci.opensoftdev.com/demo/> (May 17, 2015).

DaVinci Designer, downloaded from the Internet at: <https://web.archive.org/web/20150517001159/http://davinci.opensoftdev.com/demo/designed> (May 17, 2015).

DaVinci Viewer, downloaded from the Internet at: <https://web.archive.org/web/20150517001237/http://davinci.opensoftdev.com/demo/viewed> (May 17, 2015).

Business Card Maker & Creator (YouTube Video, published on Sep. 12, 2016, <https://www.youtube.com/watch?v=5dJmIw9DCsw> (2016).

\* cited by examiner

TECHNOLOGY FOR GENERATING PRODUCT DESIGNS USING MULTIPLE CANVASES

CROSS-REFERENCE TO RELATED APPLICATIONS

This application is a continuation of U.S. patent application Ser. No. 16/172,317, filed Oct. 26, 2018, the disclosure of which is hereby incorporated by reference in its entirety.

FIELD

The present disclosure is directed to improvements that address limitations associated with design functionalities within a user interface of an electronic device. More particularly, the present disclosure is directed to platforms and technologies to effectively display and modify design elements of digital designs of physical products.

BACKGROUND

Individuals or customers frequently purchase or order products or items for certain applications or uses. For example, an individual may order customized printed products such as brochures and business cards associated with a business. Conventionally, individuals may use tools such as graphic design software (e.g., Adobe® InDesign) or online design studios to customize the designs to be applied to certain products. These tools typically utilize predefined templates having certain design elements positioned at default locations in the templates.

An individual may often need to design front and back portions of products. For example, for products such as business cards, an individual may desire to design the front portion of a business card to include the name of the business and contact information, and the back portion of the business card to include a graphic representing the business. Conventional tools typically provide a dedicated canvas to each of the front and back portions. For example, as shown in FIGS. 2A and 2B, an individual using an exemplary tool 200 (i.e., Adobe® InDesign) may select tab 202 to design the front portion of business card 206 on dedicated canvas 210, and may select tab 212 to design the back portion of business card 206 on dedicated canvas 216. Particularly, as shown in FIG. 2A, within dedicated canvas 210, tool 200 provides a confined canvas 208 and a pane window 204. To design the front portion of business card 206, an individual may import a graphic object 209 into the confined canvas 208 by specifying a particular layer in the confined canvas 208 using the pane window 204. Similarly, as shown in FIG. 2B, to design the back portion of business card 206, an individual may be presented with a dedicated canvas 216 (i.e., different than dedicated canvas 210) to import the graphic object 209 into a confined canvas 214 by specifying a particular layer in the confined canvas 214 using the pane window 204.

There are several drawbacks of such conventional tools. Although tools may present a dedicated canvas (e.g., 210, 216), an individual is often limited to the much smaller confined canvas (e.g., 208, 214) within the dedicated canvas when designing a product. That is, the confined canvas (e.g., 208, 214) may represent areas in which the graphic objects or other objects are confined. The lack of additional design space to temporarily place design elements of a design (e.g., notes, graphics) may prevent an individual from effectively visualizing or manipulating the product throughout the design process. Further, the pane window 204 as a means to import a graphic object into the product is not user-friendly, in the sense that an individual may be required to perform a series of steps, such as (1) select the rectangular frame tool 211 on the left panel of tool 200 as shown in FIG. 2A, (2) position the rectangular frame in the confined canvas 208 to make a region to fit the graphic object, (3) import (e.g., "paste") the graphic object, (4) find the layer in which the graphic object was imported using the pane window 204, and (5) adjust (e.g., resizing) the graphic object. Additionally, by providing separate canvases for front and back portions of a product, conventional tools 200 are not user-friendly, in the sense that an individually is unable to easily glean design elements of a design (e.g., notes, graphics) associated with one canvas (e.g., 210) while using another canvas (e.g., 216). That is, an individual may have to alternate in selecting tabs 202 and 212 several times to visualize or manipulate the product throughout the design process. The drawbacks described herein is time consuming and inefficient.

Accordingly, there is an opportunity for platforms and techniques to overcome the aforementioned drawbacks and effectively modify product designs and elements thereof.

SUMMARY

The embodiments described herein generally disclose improved display interfaces, particular for electronic devices. The improved interfaces allow a user to more quickly access desired data (e.g., text objects, graphic objects) stored in, and functions of applications included in, the electronic devices. An extended workspace canvas displays a limited number of commonly accessed stored data, which itself can be reached directly from a plurality of designable canvas. In other words, the extended workspace canvas not only contains data that can be imported (e.g., "dragged and dropped") into a product being designed in a designable canvas, but it may also be shared between or among the designable canvases so that data can be imported into any of the designable canvases in use. In addition, unlike conventional confined canvas, the designable canvas described in embodiments herein do not confine data (e.g., design objects), as the data may be freely positioned from within the boundaries of the designable canvas to beyond the boundaries of the designable canvas into the extended workspace canvas, and vice versa. Accordingly, using the extended workspace canvas described herein to store data for use in a product makes it possible (unlike in conventional tools) for an individual to effectively visualize or manipulate the product throughout the design process. Further, enabling designable canvases to access a shared extended workspace canvas makes it easier (than conventional tools) for an individual to easily glean data associated with a design in one canvas while using another canvas.

In an embodiment, a computer-implemented method of displaying a visual design of a product is provided. The method may include: displaying, on a computing device having a display screen, one or more designable canvases of a user interface for editing the visual design of the product; displaying, on the user interface, an extended workspace canvas adjacent to and at least partially surrounding the one or more designable canvases, the extended workspace canvas configured to display a plurality of design elements that can be reached directly from the one or more designable canvases for use, each of the design elements configured to be selectively positioned within the one or more designable canvases; and in response to a surface change selection of the one or more designable canvases, maintaining the displaying of the extended workspace canvas while the one or more designable canvases are in a transitioning state.

In another embodiment, an electronic device for displaying a visual design of a product is provided. The electronic device may include a user interface for displaying content, a memory storing non-transitory computer executable instructions, and a processor interfacing with the user interface and the memory. The processor may be configured to execute the non-transitory computer executable instructions to cause the user interface to display: (1) the visual design comprising the plurality of design elements on one or more designable canvases of the user interface for editing the visual design of a product, and (2) an extended workspace canvas adjacent to and at least partially surrounding the one or more designable canvases. The extended workspace canvas may be configured to display a plurality of design elements that can be reached directly from the one or more designable canvases for use. Each of the design elements may be configured to be selectively positioned within the one or more designable canvases within the one or more designable canvases. The extended workspace canvas may further be displayed while the one or more designable canvases are in a transitioning state in response to a surface change selection of the one or more designable canvases.

In a further embodiment, a tangible, non-transitory computer-readable medium storing executable instructions for displaying a visual design is provided. When executed by at least one processor of a computing device, the tangible, non-transitory computer-readable medium may cause the computing device to display one or more designable canvases of a user interface for editing the visual design of a product; display, on the user interface, an extended workspace canvas adjacent to and at least partially surrounding the one or more designable canvases, the extended workspace canvas configured to display a plurality of design elements that can be reached directly from the one or more designable canvases for use, each of the design elements configured to be selectively positioned within the one or more designable canvases; and in response to a surface change selection of the one or more designable canvases, maintain the display of the extended workspace canvas while the one or more designable canvases are in a transitioning state.

DETAILED DESCRIPTION

Figure 1A:
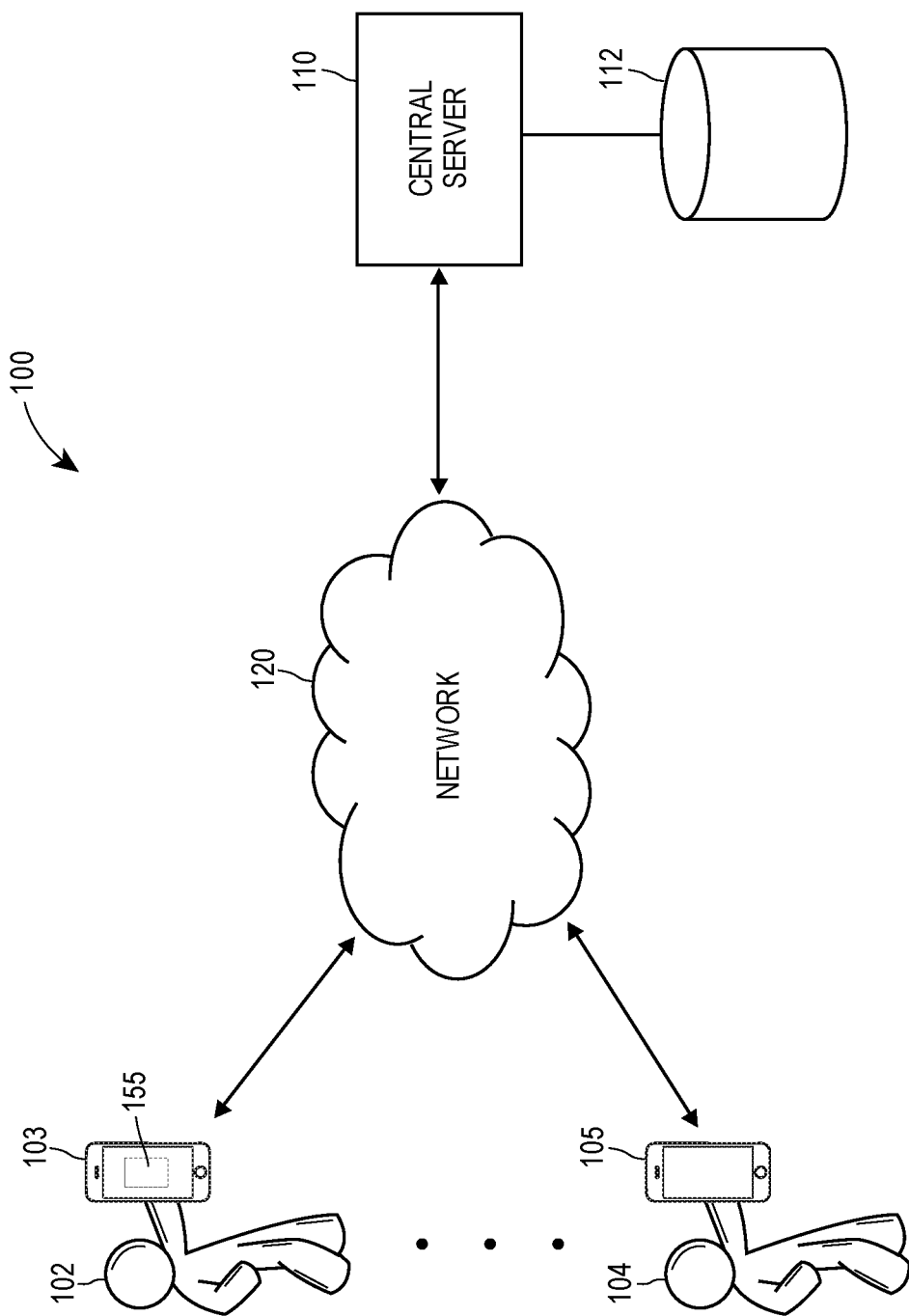
FIG. 1A depicts an overview of components and entities associated with the systems and methods, in accordance with some embodiments.

The present embodiments may relate to, inter alia, platforms and technologies for dynamically and effectively modifying product designs containing various graphical and/or textual content. According to certain aspects, an individual or customer may use an electronic device to easily view, via a user interface, not only the designs elements of the design for a physical product in contemplation of ordering the physical product, but also the designs elements that were considered during the design process of the physical product.

In addition, according to certain aspects, an individual or customer may use an electronic device to customize, via a user interface, a design for a physical product in contemplation of ordering the physical product. While customizing the design, the user may modify the design (e.g., the overall shape and/or size of the design) and/or certain elements of the design. In response to the user customizing the design, the electronic device may determine how the design itself and the certain elements of the design may be modified. In particular, the electronic device may access or identify certain properties or metadata of the design elements that define how the design elements may be modified, and may determine modifications to the design elements based on the properties or metadata. In this regard, the modified design and the modified design elements thereof may accurately reflect how the design and design elements are intended to look.

The systems and methods therefore offer numerous benefits. In particular, the effective design modification techniques result in design modifications that are desirable to customers. Accordingly, customers may experience greater flexibility and ease, and less frustration, in designing custom products. These features generally enhance the product design itself and improve the individual's experience and satisfaction when ordering the physical product via the electronic device. Additionally, companies or entities that offer the physical products for sale may experience increased sales. It should be appreciated that additional benefits are envisioned.

The systems and methods discussed herein address a challenge that is particular to e-commerce. In particular, the challenge relates to a difficulty in accurately and effectively displaying design elements of digital designs of physical products. Conventionally, a user manually designs a product by manually selecting dedicated canvases, each confined to a limited portion of the design of a product, such that non-selected canvases and other portions of the product are hidden from view. However, these conventional methods are often time consuming, ineffective, and/or expensive. The systems and methods offer improved capabilities to solve these problems by dynamically displaying a plurality of designable canvases for editing a visual design of a product, as well as an extended workspace canvas adjacent to and at least partially surrounding the one or more designable canvases to display a plurality of design elements that can be reached directly from the one or more designable canvases for use by users. Further, because the systems and methods employ communication between and among multiple devices, the systems and methods are necessarily rooted in computer technology in order to overcome the noted shortcomings that specifically arise in the realm of e-commerce.

Figure 1B:
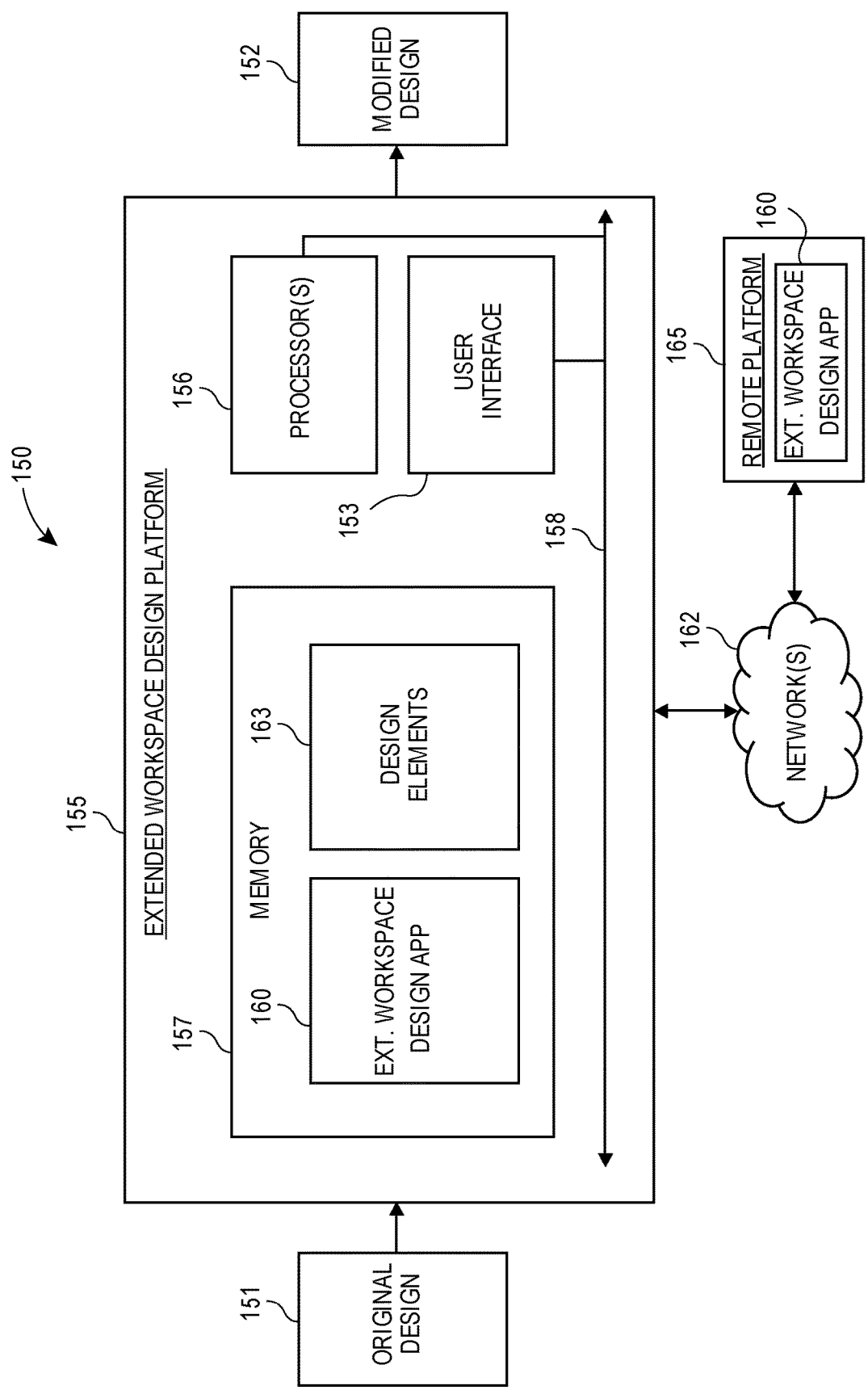
FIG. 1B depicts an overview of certain components configured to facilitate the systems and methods, in accordance with some embodiments.
Figure 2A:
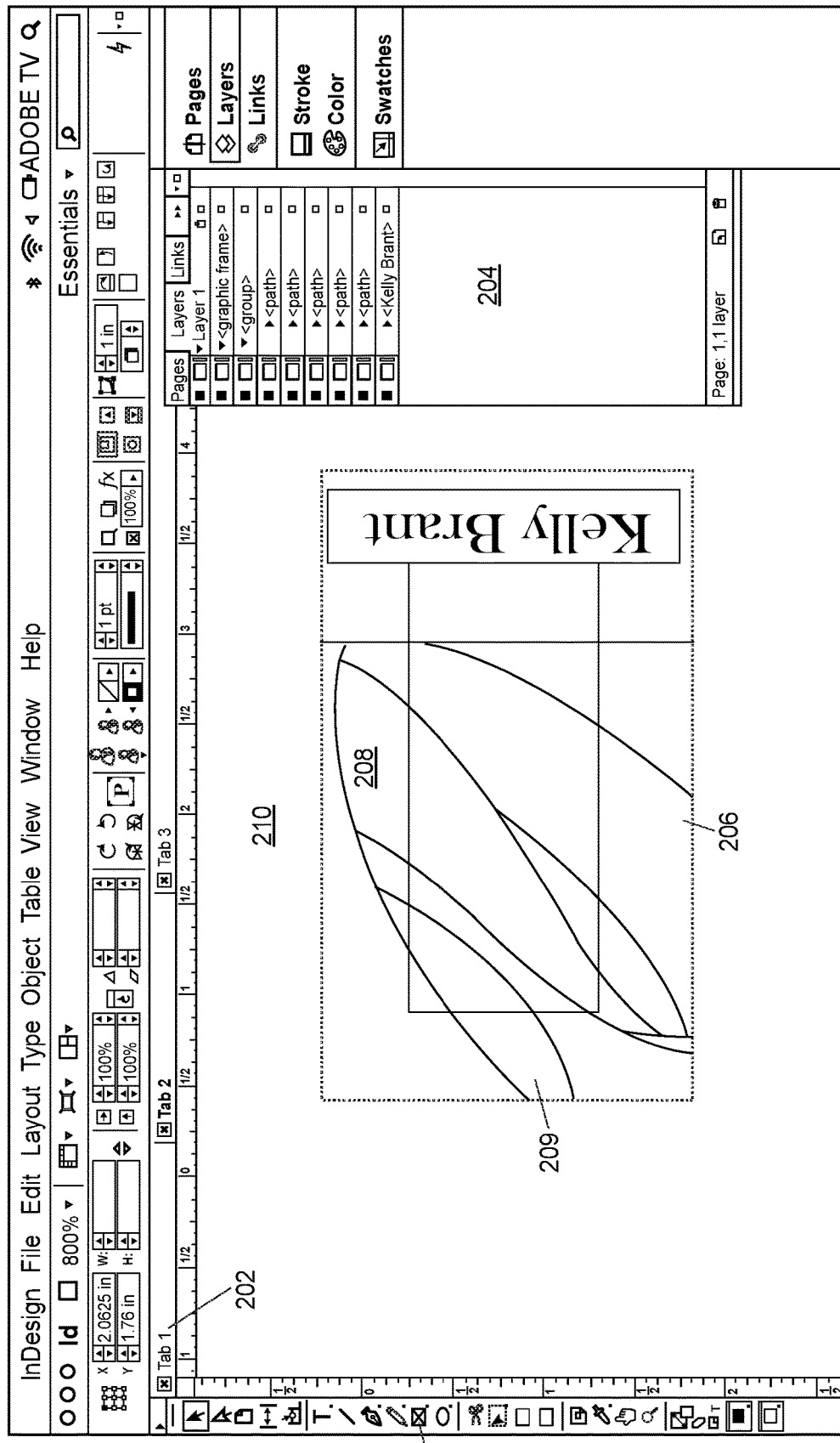
FIGS. 2A and 2B depict an example design and elements/components thereof, in accordance with the prior art.
Figure 2B:
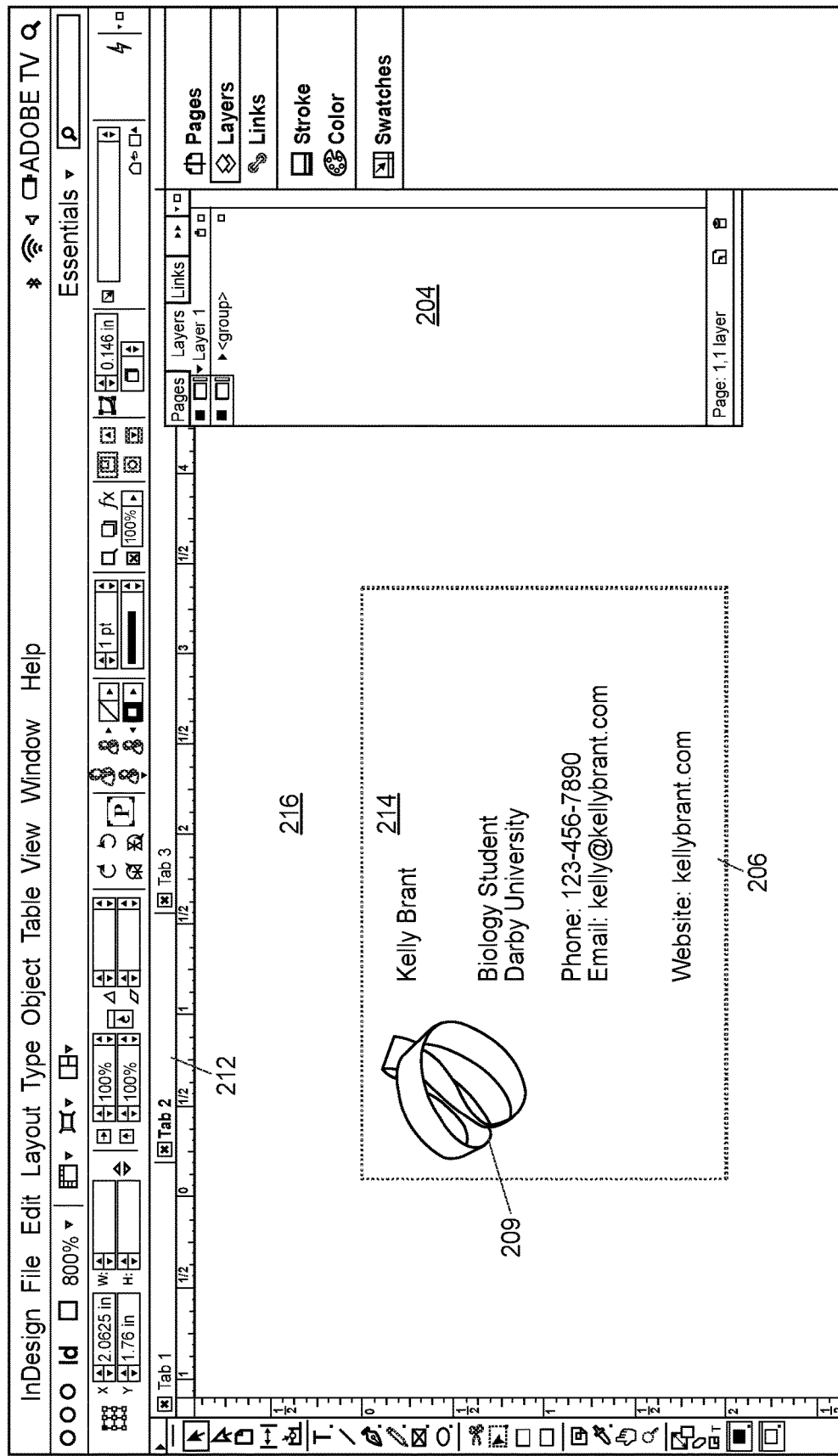

The term "canvas" as used herein refers to a designable area (e.g., rectangular area) displayed within a design application or platform (e.g., extended workspace design platform 155, extended workspace design 160 of FIG. 1B) to enable a user to add or modify design elements to design a product. The terms "components," "elements," "design elements," and "design objects" may be used interchangeably throughout this description. Similarly, the terms "properties," "metadata," and "rules" may be used interchangeably throughout this description.

FIG. 1A illustrates an overview of a system 100 of components configured to facilitate the systems and methods. It should be appreciated that the system 100 is merely an example and that alternative or additional components are envisioned.

As illustrated in FIG. 1A, the system 100 may include a set of users 102, 104 or individuals having or interacting with a respective set of electronic devices 103, 105. Each of the users 102, 104 may be any individual or person who may be interested in purchasing products, products, and/or services that may be offered for sale by an entity. In an embodiment, the entity may be a corporation, company, partnership, retailer, wholesaler operating on behalf of another entity (e.g., a white label wholesaler), or the like, where the entity may offer an e-commerce platform (e.g., a website accessible by or an application executable by the electronic devices 103, 105) and optionally a set of brick-and-mortal retail stores. Each of the electronic devices 103, 105 may be any type of electronic device such as a mobile device (e.g., a smartphone), desktop computer, notebook computer, tablet, phablet, GPS (Global Positioning System) or GPS-enabled device, smart watch, smart glasses, smart bracelet, wearable electronic, PDA (personal digital assistant), pager, computing device configured for wireless communication, and/or the like. An extended workspace design platform 155 for modifying digital designs of physical products may be implemented on any one or more of the electronic devices 103, 105.

The electronic devices 103, 105 may communicate with a central server 110 via one or more networks 120. The central server 110 may be associated with the entity that owns and/or manages the e-commerce platform(s) and/or the set of brick-and-mortal retail stores. In particular, the central server 110 may include or support a web server configured to host a website that offers various products and/or services for purchase by users. Further, the central server 110 may support a software application executable by the set of electronic devices 103, 105 (i.e., the set of electronic devices 103, 105 may interface with the central server 110 in executing the software application). In embodiments, the network(s) 120 may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others).

Although depicted as a single central server 110 in FIG. 1A, it should be appreciated that the server 110 may be in the form of a distributed cluster of computers, servers, machines, or the like. In this implementation, the entity may utilize the distributed server(s) 110 as part of an on-demand cloud computing platform. Accordingly, when the electronic devices 103, 105 interface with the server 110, the electronic devices 103, 105 may actually interface with one or more of a number of distributed computers, servers, machines, or the like, to facilitate the described functionalities.

The central server 110 may be configured to interface with or support a memory or storage 112 capable of storing various data, such as in one or more databases or other forms of storage. According to embodiments, the storage 112 may store data or information associated with products or services that are offered for sale by the entity that owns and/or manages the e-commerce platform and/or the set of brick-and-mortal retail stores. For example, the storage 112 may store information associated with office supplies such as business cards and notepads, including information associated with a customer or client (e.g., company name and logo). For further example, the storage 112 may store templates of designs, as well as information associated with the designs, including properties (e.g., metadata) of the elements/components of the designs.

Although two (2) users 103, 105, two (2) electronic devices 103, 105, and one (1) server 110 are depicted in FIG. 1A, it should be appreciated that greater or fewer amounts are envisioned. For example, there may be multiple central servers, each one associated with a different entity. Additionally, the electronic devices 103, 105 and the central server 110 may interface with one or more separate, third-party servers (not depicted in FIG. 1A) to retrieve relevant data and information.

According to embodiments, the users 102, 104 may select a design(s) of a product to preview and modify using the respective electronic devices 103, 105, such as in contemplation of placing an order for the product(s). The design(s) may include a set of design elements, each of which has a property (e.g., as defined by metadata). The users 102, 104 may use the respective electronic devices 103, 105 to modify selected design elements. In response, the respective electronic devices 103, 105 (or in some cases, the central server 110) may determine, based on the respective characteristic(s) or property(ies), how to modify the selected design elements, as well as any additional design element(s) that may be affected by the modification of the selected design elements. Accordingly, the respective electronic devices 103, 105 may display the modified design for review by the users 102, 104. FIG. 1B depicts more specific components associated with the systems and methods.

FIG. 1B illustrates an example environment 150 in which an original design 151 is processed into a modified design 152 via an extended workspace design platform 155, according to embodiments. The extended workspace design platform 155 may be implemented on any computing device, including one or more of the electronic devices 103, 105 or the server 110 as discussed with respect to FIG. 1A. Components of the computing device may include, but are not limited to, a processing unit (e.g., processor(s) 156), a system memory (e.g., memory 157), and a system bus 158 that couples various system components including the memory 157 to the processor(s) 156. In some embodiments, the processor(s) 156 may include one or more parallel processing units capable of processing data in parallel with one another. The system bus 158 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The extended workspace design platform 155 may further include a user interface 153 configured to present content (e.g., designs and components/elements thereof). Additionally, a user may make selections to the content via the user interface 153, such as to modify designs (or design elements thereof) presented thereon. The user interface 153 may be embodied as part of a touchscreen configured to sense touch interactions and gestures by the user. Although not shown, other system components communicatively coupled to the system bus 158 may include input devices such as cursor control device (e.g., a mouse, trackball, touch pad, etc.) and keyboard (not shown). A monitor or other type of display device may also be connected to the system bus 158 via an interface, such as a video interface. In addition to the monitor, computers may also include other peripheral output devices such as a printer, which may be connected through an output peripheral interface (not shown).

The memory 157 may include a variety of computer-readable media. Computer-readable media may be any available media that can be accessed by the computing device and may include both volatile and nonvolatile media, and both removable and non-removable media. By way of non-limiting example, computer-readable media may comprise computer storage media, which may include volatile and nonvolatile, removable and non-removable media implemented in any method or technology for storage of information such as computer-readable instructions, routines, applications (e.g., an extended workspace design application 160) data structures, program modules or other data. Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the processor 156 of the computing device.

The extended workspace design platform 155 may operate in a networked environment and communicate with one or more remote platforms, such as a remote platform 165, via a network 162, such as a local area network (LAN), a wide area network (WAN), or other suitable network. The platform 165 may be implemented on any computing device, including one or more of the electronic devices 103, 105 or the server 110 as discussed with respect to FIG. 1A, and may include many or all of the elements described above with respect to the extended workspace design platform 155. In some embodiments, as will be described herein, the extended workspace design application 160 as will be further described herein may be stored and executed by the remote platform 165 instead of by or in addition to the extended workspace design platform 155.

According to embodiments, the extended workspace design platform 155 (and more particularly, the extended workspace design application 160) may process or modify the original design 151 to produce the modified design 152. It should also be understood that although only one of each of the original design 151 and the modified design 152 is shown, the example environment 150 may be configured to process or modify multiple designs. Each of the original design 151 and the modified design 152 may be embodied as any type of electronic document, file, template, etc., that may include a set of design elements or components, each of which may be some type of displayable content (e.g., a combination of textual and/or visual content).

The memory 157 may further store design elements 163 accessible to the extended workspace design application 160. According to embodiments, the extended workspace design application 160 may process the original design 151 by modifying, deleting, inserting, and/or replacing certain of the set of design elements included in the original design 151. Each of the design elements included in the original design 151 and in the design elements 163 may have associated metadata that may define how the corresponding design element is to be presented within the original design 151 and/or modified based on a modification(s) to another design element(s).

A user may make certain modifications to the original design 151 (or to design element(s) thereof), and the extended workspace design application 160 may facilitate displaying the modifications of the design element(s) according to the metadata of the design element(s). In embodiments, the designs 151, 152, the design elements, and the metadata thereof may be implemented using any type of file format. For example, the metadata may be in JavaScript Object Notation (JSON) format, or another format(s).

The extended workspace design application 160 may cause the design elements (and any modifications thereof) to be displayed on the user interface 153 for review by the user. The user may select to complete the modification of the original design 151, at which point the extended workspace design application 160 may output or otherwise avail the modified design 152 according to the modifications. In embodiments, the designs 151, 152 may be stored in memory as program data in a hard disk drive, magnetic disk and/or optical disk drive in the extended workspace design platform 155 and/or the remote platform 165. The design processing and modification techniques discussed herein are illustrated in certain of the following figures.

In embodiments, an individual such as a designer may use various components of the extended workspace design platform 155 to create or design a set of original designs (such as the original design 151). In particular, the individual may interface with the user interface 153 to make various selections to create an original design, such as choosing one or more of the design elements 163. An original design may serve as a design template that may be selected by a user (e.g., a customer) and modified into a customized design that suits a purpose of the user.

FIGS. 3A-3E depict an exemplary extended workspace design application 160 as displayed on user interface 153 to display and create the product design and components thereof, as well as certain user interactions therewith. The design and components thereof may be presented on a user interface of a computing device, where a user of the computing device may interact with and make selections, via the user interface, in association with the design and components thereof. Accordingly, the user may select to manually create or adjust the product design. In some embodiments, the extended workspace design application 160 may be accessed from memory 157 and executed by the processor 156 of the computing device. In other embodiments, the processor 156 may execute a web browser stored in memory 157, which in turn may access a web-based extended workspace design application 160 stored in a remote platform 165 via the network 162. In any case, a user may launch the extended workspace design application 160 to display design elements (and any modifications thereof) on the user interface 153 for editing and reviewing by the user.

Figure 3A:
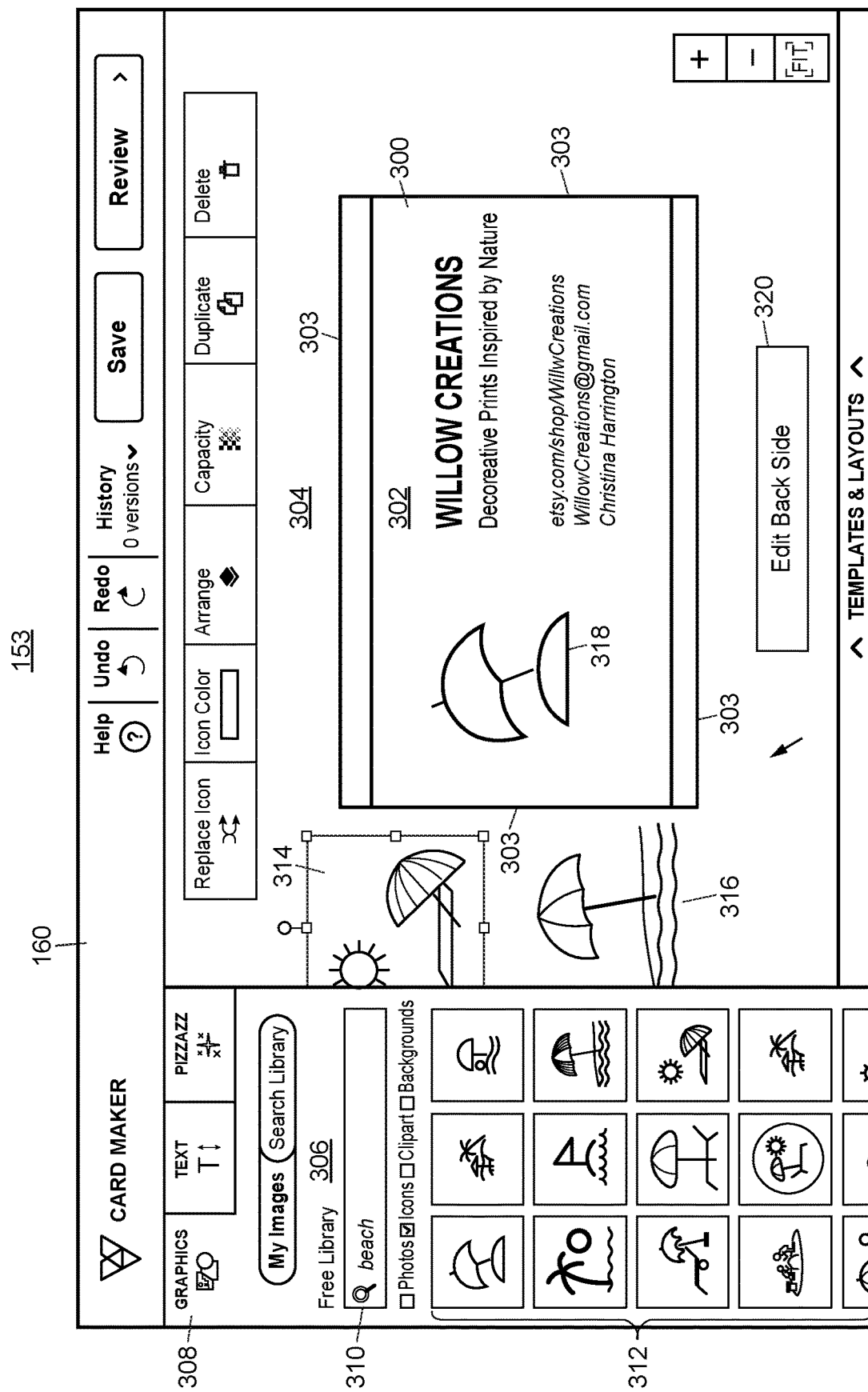
FIGS. 3A-3E depict an example design and elements/components thereof, in accordance with some embodiments.

As shown in FIG. 3A, the extended workspace design application 160 may include a designable canvas 302 for editing the visual design of a product 300 (e.g., a flyer, a business card, etc.) and an extended workspace canvas 304 adjacent to and at least partially surrounding designable canvas 302. Although extended workspace canvas 304 is depicted as completely surrounding designable canvas 302 (i.e., surrounding all four edges of the designable canvas 302) in FIG. 3A, extended workspace canvas 304 may partially surround designable canvas 302, such as surrounding less than four edges of the designable canvas 302 (e.g., three edges) in other embodiments. The extended workspace design application 160 may also include a library menu 306 of display elements adjacent to the extended workspace canvas 304. By selecting the graphics tab 308 in the library menu 306, a user may input a text stream (e.g., "beach") into a search box 310 to find a plurality of design objects 312. Thereafter, the extended workspace design application 160 advantageously allows the user to select one or more of the design objects 312 and temporarily place instances of the selected design objects (s) 312 (e.g., 314, 316) in extended workspace canvas 304 without disturbing the visual design of the product 300 shown in designable canvas 302. By temporarily placing the selected design objects in the extended workspace canvas, users be able to easily visualize how the design objects may appear in the visual design of the product 300 shown in designable canvas 302 when placed in designable canvas 302. Further advantages include allowing the users to save design objects for later use in designable canvas 302 by storing them in the extended workspace canvas.

The extended workspace canvas 304 may be a transparent canvas that stretches beyond the height and/or width of the designable canvas 302. Accordingly, the extended workspace canvas 304 serves as additional design space for the user to manipulate and save design elements, such as design objects 314, 316, throughout the design process of the product 300 shown in designable canvas 302. The extended workspace canvas 304 may include translucent veils that are arranged to display any design objects displayed in extended workspace canvas 304 less vibrantly than the design objects displayed in the designable canvas 302. For example, the extended workspace canvas 304 may present any of the design elements (e.g., text, design objects) in faint colors (i.e., as shown in FIG. 3A). By presenting design elements in faint colors, the extended workspace canvas 304 may further contrast the temporarily placed design elements from those that are included in the visual design of the product shown in designable canvas 302. At the end of the design process, the extended workspace design application 160 may exclude the temporarily placed design elements displayed in the extended workspace canvas 304 when exporting the visual design of the product 300 indicated in designable canvas 302.

Any of the design elements temporarily placed on the extended workspace canvas 304 may be directly reached from designable canvas 302. That is, each of the design elements may be configured to be selectively positioned within designable canvas 302. As shown in FIG. 3A, a user may "drag and drop" design object 318 from extended workspace canvas 304 to designable canvas 302. The designable canvas 302 does not confine design elements, as the design elements may be freely positioned from within the boundaries 303 of the designable canvas 302 to beyond the boundaries 303 of the designable canvas 302 into the extended workspace canvas 304, and vice versa. Accordingly, and advantageously, the extended workspace design application 160 enables a user to transfer design elements from one or more designable canvases to the extended workspace canvas, and vice versa, without any of the design elements temporarily placed on the extended workspace canvas being hidden from view.

Figure 3B:
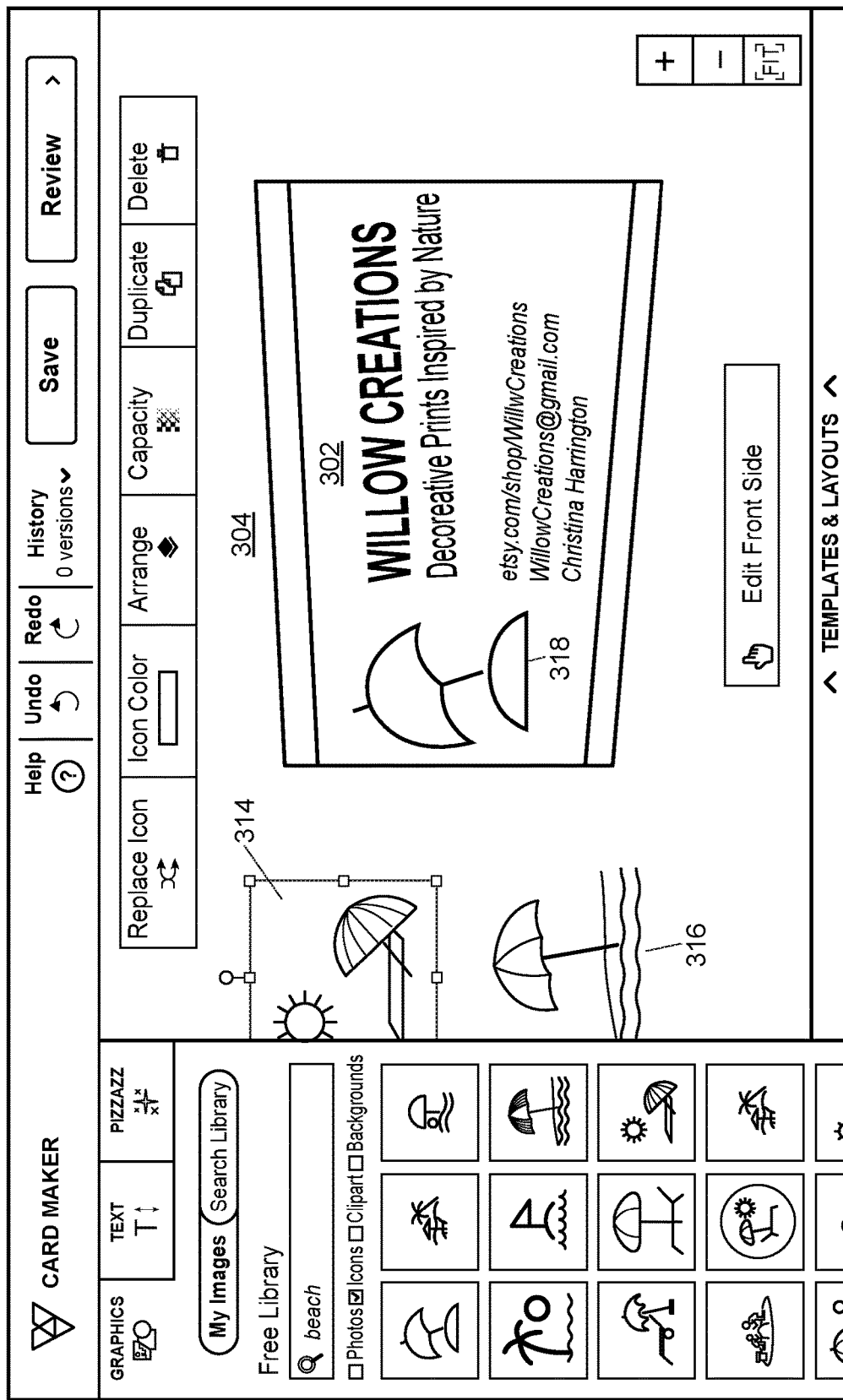
Figure 3C:
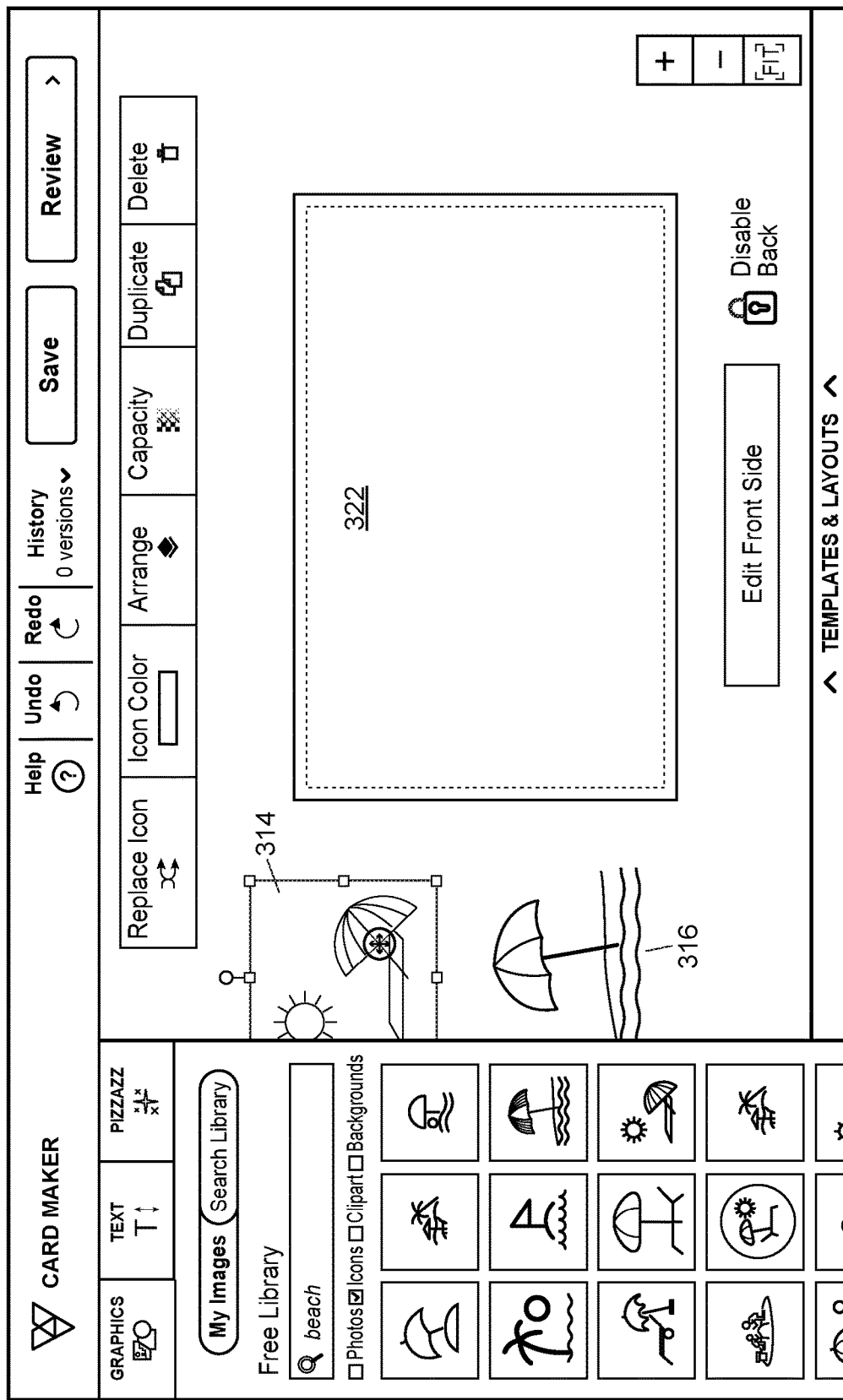

Because design elements may be freely positioned from within the boundaries 303 of the designable canvas 302 to beyond the boundaries 303 of the designable canvas 302 into the extended workspace canvas 304, it may be possible for design elements to "hang" on one of the edges of the boundaries 303 (e.g., the left edge). In other words, design elements may straddle between designable canvas 302 and extended workspace canvas 304. The extended workspace design application 160 may configured to any ignore any portion of design elements beyond the boundaries 303 of the designable canvas 302 into the extended workspace canvas 304 when generating the final design of the product. Some products (e.g., product 300) may have two surfaces (e.g., have a front side and a back side). For example, a business card may have a front side showing contact information of a business, and a back side showing a logo of a business. In FIG. 3A, designable canvas 302 may be used to design the front side of product 300. When the user desires to design the back side of product 300, the user may select button 320, which will cause designable canvas 302 to digitally flip over. As shown in FIG. 3B, the extended workspace design application 160 may display an animation sequence of the digital flip (e.g., a 180 degree rotation along the vertical axis of the designable canvas 302). As a result of the digital flip, as shown in FIG. 3C, a designable canvas 322 having the same dimensions as designable canvas 302 may be presented to the user. Accordingly, the animation sequence may correspond to a digital transitioning state (e.g., flipping state) between transitioning from the designable canvas 302 to the designable canvas 322. Of course, the animation sequence may include other visual effects, such as swiveling along the horizontal axis of the designable canvas 302.

Importantly, as shown in FIG. 3B or FIG. 3C, in response to a surface change selection (e.g., selection of button 320), the extended workspace design application 160 continues to display the extended workspace canvas during and after the designable canvas 302 digitally transitions (e.g., flips over). In addition, the temporarily placed instances of the selected design object(s) 312 (e.g., 314, 316) continue to be displayed in extended workspace canvas 304. Effectively, extended workspace design application 160 may determine that selected design objects 314, 316 were displayed on the extended workspace canvas 304 just prior to receiving a surface change selection from a user, and subsequently continue to display selected design objects 314, 316 on the extended workspace canvas 304 simultaneously with the designable canvas 302 during its digital transition (i.e., as shown in FIG. 3B) or the designable canvas 322 after the designable canvas 302 completes its digital transition (i.e., as shown in FIG. 3C).

Of course, it should be recognized that the design elements displayed on the extended workspace canvas 304 as it is simultaneously displayed with the designable canvas 302 or the designable canvas 322 varies with actions of a user. Although design objects 314, 316 are shown to be displayed on the extended workspace canvas 304 in FIGS. 3A-3C, more or less design elements may be displayed.

Figure 3D:
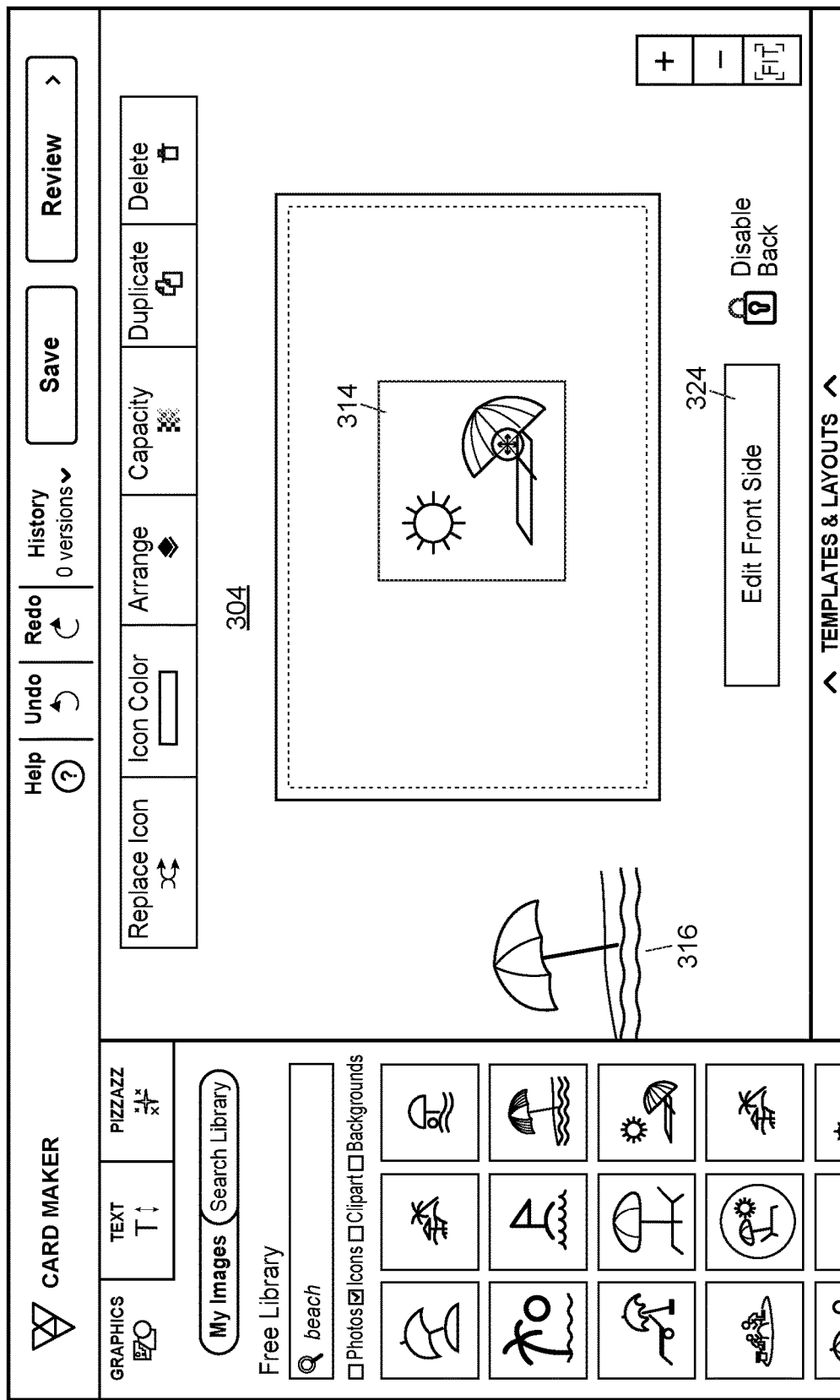
Figure 3E:
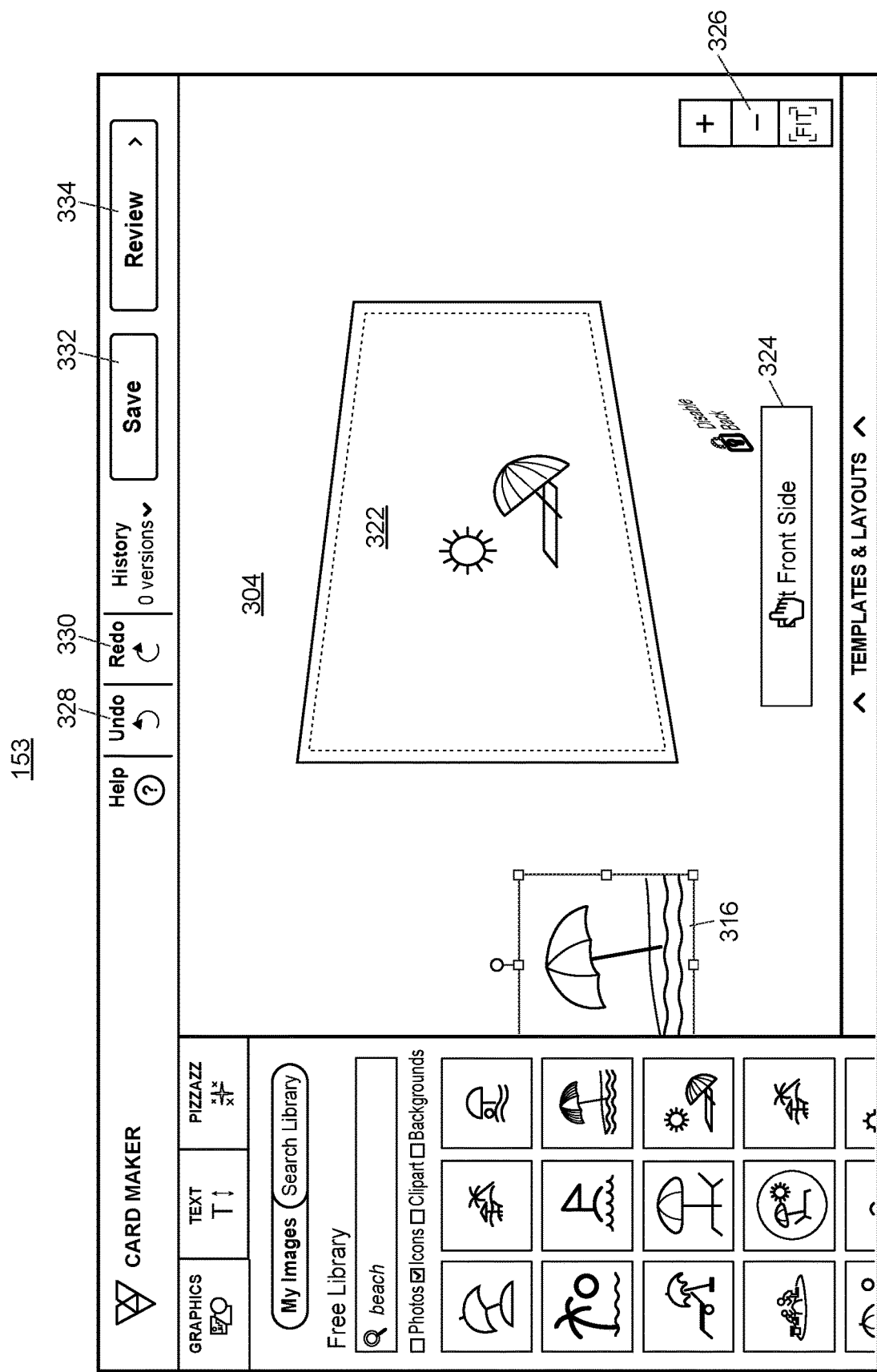

As shown in FIG. 3D, when designable canvas 302 is entirely transitioned to designable canvas 322 (e.g., digitally flipped over), designable canvas 302 is hidden and designable canvas 322 is displayed in response to the surface change selection. The user may continue to design the back side of product 300 by placing design elements either already displayed on the extended workspace canvas 304 (e.g., design objects 314) or by selecting and placing one of a plurality of design objects 312 displayed in library menu 306 into designable canvas 322. When the user desires to view the front side of product 300 again, the user may select button 324, which will cause designable canvas 322 to digitally flip over. Extended workspace design application 160 may determine the design elements (i.e., in this case, only graphic objects 316) displayed on the extended workspace canvas 304 just prior to receiving a surface change selection from a user, and subsequently continue to display graphic objects 316 on the extended workspace canvas 304 simultaneously with the designable canvas 322 during its digital transition (i.e., as shown in FIG. 3E) or the designable canvas 302 after the designable canvas 322 completes its digital transition. That is, when designable canvas 322 is entirely transitioned to designable canvas 302 (e.g., digitally flipped over), designable canvas 322 is hidden and designable canvas 302 is displayed in response to the surface change selection.

The user may perform other actions with respect to the design portrayed in designable canvases 302, 322. For example, referencing FIG. 3E, the user may zoom in, zoom out, or fit the designable canvases 302, 322 canvases on the screen, upon selection of buttons 326. In some embodiments, only the design elements displayed in the designable canvases 302, 322 may scale appropriately upon selection of buttons 326. In other embodiments, the temporarily placed design elements on extended workspace canvas 304 may also scale, along with those displayed in the designable canvases 302, 322. As other examples, the user may undo a design action upon selecting button 328, redo a design action upon selecting button 330, save the design of the product upon selecting 332 (which may also save the temporarily placed design elements on extended workspace canvas 304), and review the design upon selecting button 334 prior to finalizing the design of the product for purchase.

The selected design objects (e.g., 314, 316) shown in FIGS. 3A-3E may have associated metadata, where the characteristic(s) of each design object defines how the design object may be modified. According to embodiments, each of the design objects may have associated a rule(s) or metadata that defines the behavior or modification of the design objects in response to a modification to the design objects. As used herein, the rule(s) or metadata that defines the behavior of a design object may be referred to as a "design object behavior."

In an embodiment, in response to a design object spatially adjusting (i.e., resizing or repositioning), a computing device may determine how the corresponding design object should adjust based on the design object behavior of that design object. For example, the metadata may define that the design object should scale proportionally, that the design object should resist deforming, that the design object should preserve its aspect ratio, that the design object should be distorted, that the design object should be filled with a different color, and/or other behaviors.

For example, if the design object is an image, the design object behavior may define that the image should crop (or stretch, or fit as best possible) to fit the determined adjusted design object. As another example, if the design object is an image, the design object behavior may define that the text should change fonts, size, stretch, shrink, etc.

Generally, a computing device on which design objects are displayed (or remote from another device that displays the design objects) may determine how to modify the design objects, based on modifications to any of the design objects as well as on any metadata applicable to the design objects.

It should be noted that although FIGS. 3A-3E depict an embodiment of the extended workspace design application 160 configured to display and create the design and components of a two-surface product such as a business card, the extended workspace design application 160 may be configured to design products having more than two surfaces in other embodiments, and therefore may display a designable canvases for each of the surfaces. For example, the extended workspace design application 160 may enable a user to design packaging for a six-surface product (e.g., a cereal box) or a five-surface product (e.g., square pyramid) by displaying six or five designable canvases to use, respectively. In response to a surface change selection of the one or more designable canvases (e.g., from a square surface to a triangle surface of the square pyramid product), the extended workspace design application 160 may maintain the displaying of the extended workspace canvas while the one or more designable canvases are in a transitioning state. An animation sequence (e.g., having a rotating or revolving effect) may correspond to the transitioning state between the transitioning designable canvases. As a result of the digital transition, a designable canvas (e.g., shaped as a triangle) having different dimensions as the one (e.g., shaped as a square) prior to the transition may be presented to the user.

Figure 4:
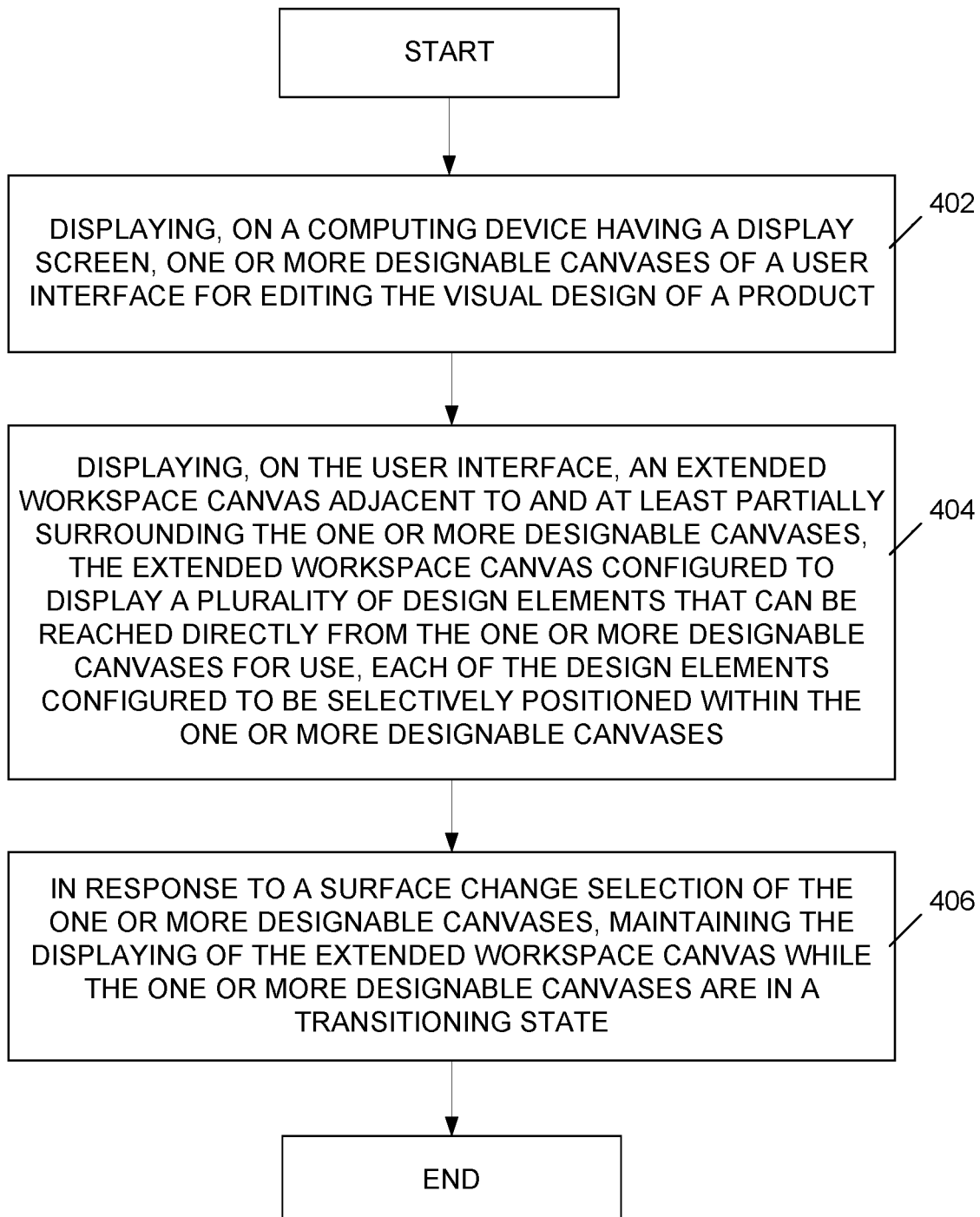
FIG. 4 depicts an example flow diagram associated with modifying a visual design, in accordance with some embodiments.

FIG. 4 depicts a block diagram of an example method 400 for modifying a visual design comprising a plurality of design elements. The method 400 may be facilitated by an electronic device (such as either of the devices 103, 105 as depicted in FIG. 1A) that may be in communication with a server (such as the central server 110 as discussed with respect to FIG. 1A). In embodiments, the method 400 may be at least partially facilitated by a remote server, such as the central server 110 as discussed with respect to FIG. 1A.

The method 400 may begin when the electronic device displays (block 402), in a user interface, one or more designable canvases for editing the visual design of the product. For example, and referencing FIGS. 3A and 3C, the electronic device may display designable canvas 302 to enable a user to design a front side of a product and designable canvas 322 to enable a user to design a back side of a product.

The electronic device may display (block 404), in the user interface, an extended workspace canvas adjacent to and at least partially surrounding the one or more designable canvases. The extended workspace canvas may be configured to display a plurality of design elements that can be reached directly from the one or more designable canvases for use. Each of the design elements may be configured to be selectively positioned within the one or more designable canvases. For example, and referencing FIG. 3A, the electronic device may receive, via the user interface, a selection to position design object 318 from a first location (e.g., from left portion of extended workspace canvas 304, not shown) to a second location (e.g., to left portion of designable canvas 302). In response, the electronic device may display, in the user interface, the design object 318 positioned to the second location reflecting the desired selection.

In addition, the electronic device may receive, via the user interface, a selection to resize or otherwise modify any of the design elements either within the one or more designable canvases or the extended workspace canvas. In response, the electronic device may display, in the user interface, modification of any of the design elements reflecting the desired selection. In some embodiments, design elements that migrate from the extended workspace canvas to the one or more designable canvases (or vice versa, i.e., from the one or more designable canvases to the extended workspace canvas) may maintain its metadata, such that any modification to any of the design elements made either within the one or more designable canvases or the extended workspace canvas remain preserved. In doing so, the electronic device, via the user interface, may save any design efforts made to any of the design elements, regardless of where the design elements are displayed within the user interface, to facilitate the visualization or manipulation of a product throughout the design process for the user.

The electronic device may, in response to a surface change selection of the one or more designable canvases, maintain (block 406) the displaying of the extended workspace canvas (and any of the design elements displayed on the extended workspace canvas) while the one or more designable canvases are in a digital transitioning state. Due to the independent/separate nature of the extended workspace canvas from the one or more designable canvases, the extended workspace canvas does not follow a designable canvas digitally transitioning, and accordingly, remains anchored. For example, referencing FIGS. 3B-3C, the extended workspace canvas remains in place during the digital transitioning state, such as between flipping the designable canvas 302 and the designable canvas 322. Further, during the digital transitioning state, design elements displayed on the extended workspace canvas remain unchanged (i.e., preserve its metadata). For example, referencing FIGS. 3B-3C, design objects 314, 316 may maintain its positions, sizes, etc. on the extended workspace canvas 304 during the digital transitioning state of the designable canvas 302.

Similarly, during the digital transitioning state, the design elements displayed on the one or more designable canvases remain unchanged (i.e., preserve its metadata). Referencing FIGS. 3B-3C, design object 318 may maintain its position, size, etc. on the designable canvas 302 during the digital transitioning state of the designable canvas 302, such that when the designable canvas 302 is digitally flipped back to the state shown in FIG. 3A, design object 318 may remain unchanged. For example, if design object 318 is displayed in a position corresponding to 20% of the width and 50% of the height of the designable canvas 302 and entirely within the boundaries 303 of designable canvas 302 prior to selection of button 320 as depicted in FIG. 3A, in response to a surface change selection of the designable canvases 322 upon selection of button 324 as depicted in FIG. 3E, the electronic device may display the design object 318 in the same position (i.e., corresponding to 20% of the width and 50% of the height of the designable canvas 302) when the designable canvas 302 is digitally flipped back to the state shown in FIG. 3A.

As another example, if a much larger design object 318 (not illustrated) has a center positioned at 20% of the width and 50% of the height of the designable canvas 302, but the larger design object 318 spans the designable canvas 302 and the extended workspace canvas 304 (i.e., straddles between designable canvas 302 and extended workspace canvas 304), in response to a surface change selection of the designable canvases 322 upon selection of button 324, the electronic device may display the design object 318 in the same position (i.e., the center of the design object 318 corresponding to 20% of the width and 50% of the height of the designable canvas 302) when the designable canvas 302 is digitally flipped back to the state shown in FIG. 3A, but the portion of the design object 318 that extended into the extended workspace canvas 304 prior to the surface change selection may be deleted or otherwise hidden from view.

Figure 5A:
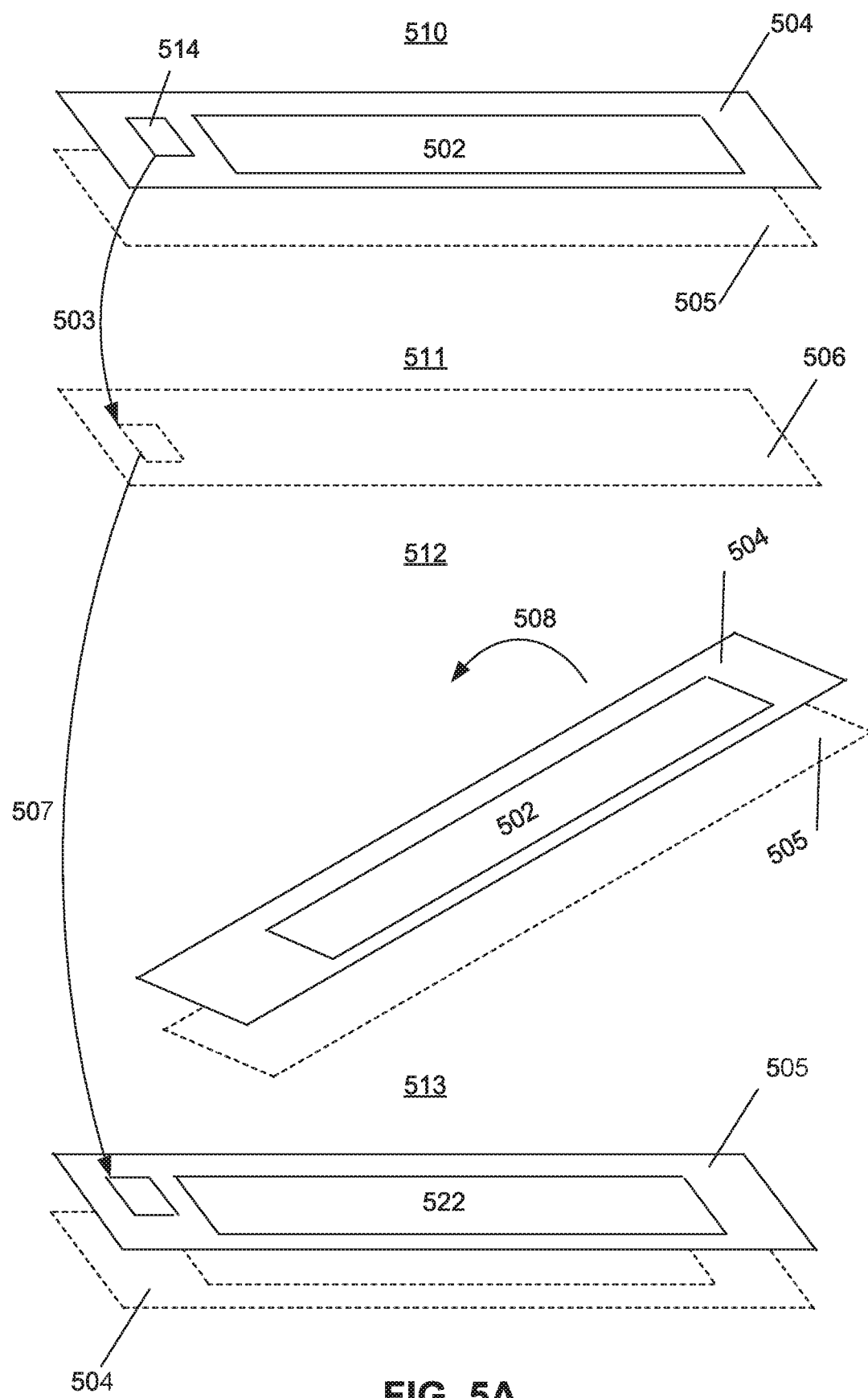
FIGS. 5A-5B illustrate example transition diagrams in response to a surface change selection, in accordance with some embodiments.
Figure 5B:
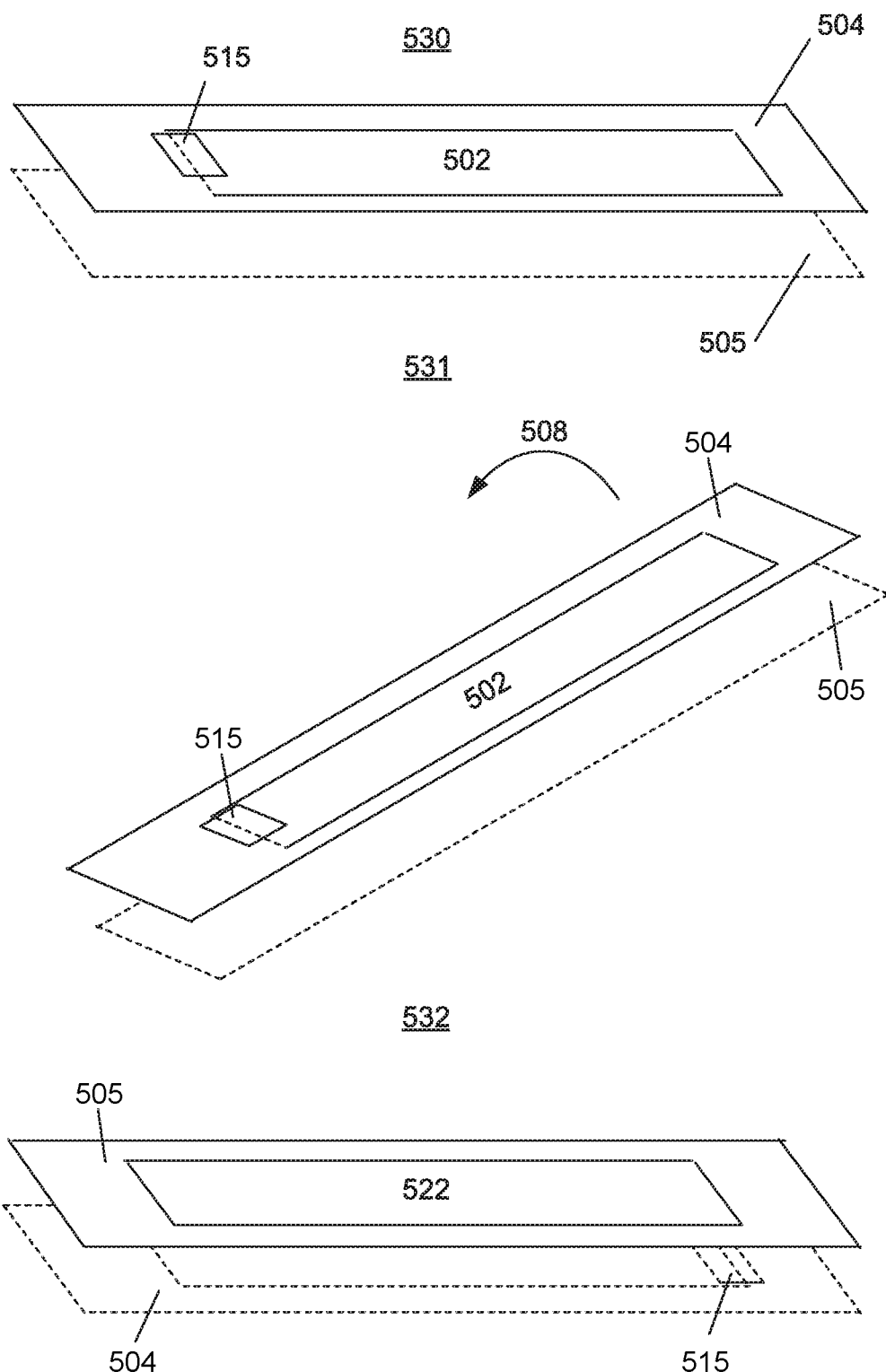

FIGS. 5A-5B illustrate example transition diagrams in response to a surface change selection, in accordance with some embodiments. As shown in FIG. 5A, beginning in step 510, design object 514 (such as design object 314 as discussed with respect to FIG. 3A) may be temporarily placed and displayed in extended workspace canvas 504 (such as extended workspace canvas 304 as discussed with respect to FIG. 3A) without disturbing (e.g., intersecting) the visual design of the product shown in designable canvas 502 (such as designable canvas 302 as discussed with respect to FIG. 3A). Designable canvas 522 (not shown) is hidden from the user's view. In response to a surface change selection (e.g., a flip selection), as shown in step 511, the extended workspace design application 160 may temporarily re-locate (503) design object 514 to a temporary canvas 506. The extended workspace design application 160 proceeds to digitally transition (e.g., flip 508) the designable canvas 502, as shown in step 512. Upon completion of the digital transition such that designable canvas 522 (such as designable canvas 322 as discussed with respect to FIG. 3C) may be presented to the user, thereby hiding designable canvas 502 from the user's view, the extended workspace design application 160 may retrieve design object 514 that was temporarily placed in the temporary canvas 506 and place (507) it in extended workspace canvas 505 (such as extended workspace canvas 304 as shown with respect to FIG. 3D), as shown in step 513. By re-locating the design object 514 described in step 511 and retrieving it in step 513, the extended workspace design application 160 is able to deliberately prevent design object 514 from flipping with designable canvas 502.

FIG. 5B illustrates a particular digital transition that does not utilize the temporary canvas 506. Beginning in step 530, design object 515 (such as design object 316 as discussed with respect to FIG. 3A) may be "hanging" (as shown) along a boundary (such as boundary 303 as discussed with respect to FIG. 3A) or otherwise entirely within designable canvas 502 (not shown). That is, the design object 515 may be part of the visual design of the product shown in designable canvas 502. Designable canvas 522 (not shown) is hidden from the user's view. In response to a surface change selection (e.g., a flip selection), as shown in step 531, the extended workspace design application 160 may proceed to digitally transition (e.g., flip 508) the designable canvas 502. Because design object 515 is part of the visual design of the product, it need not be temporarily re-located to a temporary canvas 506, unlike the digital transition shown in FIG. 5A. That is, the extended workspace design application 160 need not deliberately prevent design object 515 from flipping with designable canvas 502 because it is a part of the visual design of the product shown in designable canvas 502. Upon completion of the digital transition, the extended workspace design application 160 may present designable canvas 522 to the user, as shown in step 532, thereby hiding designable canvas 502 and design object 515 from the user's view.

Figure 6:
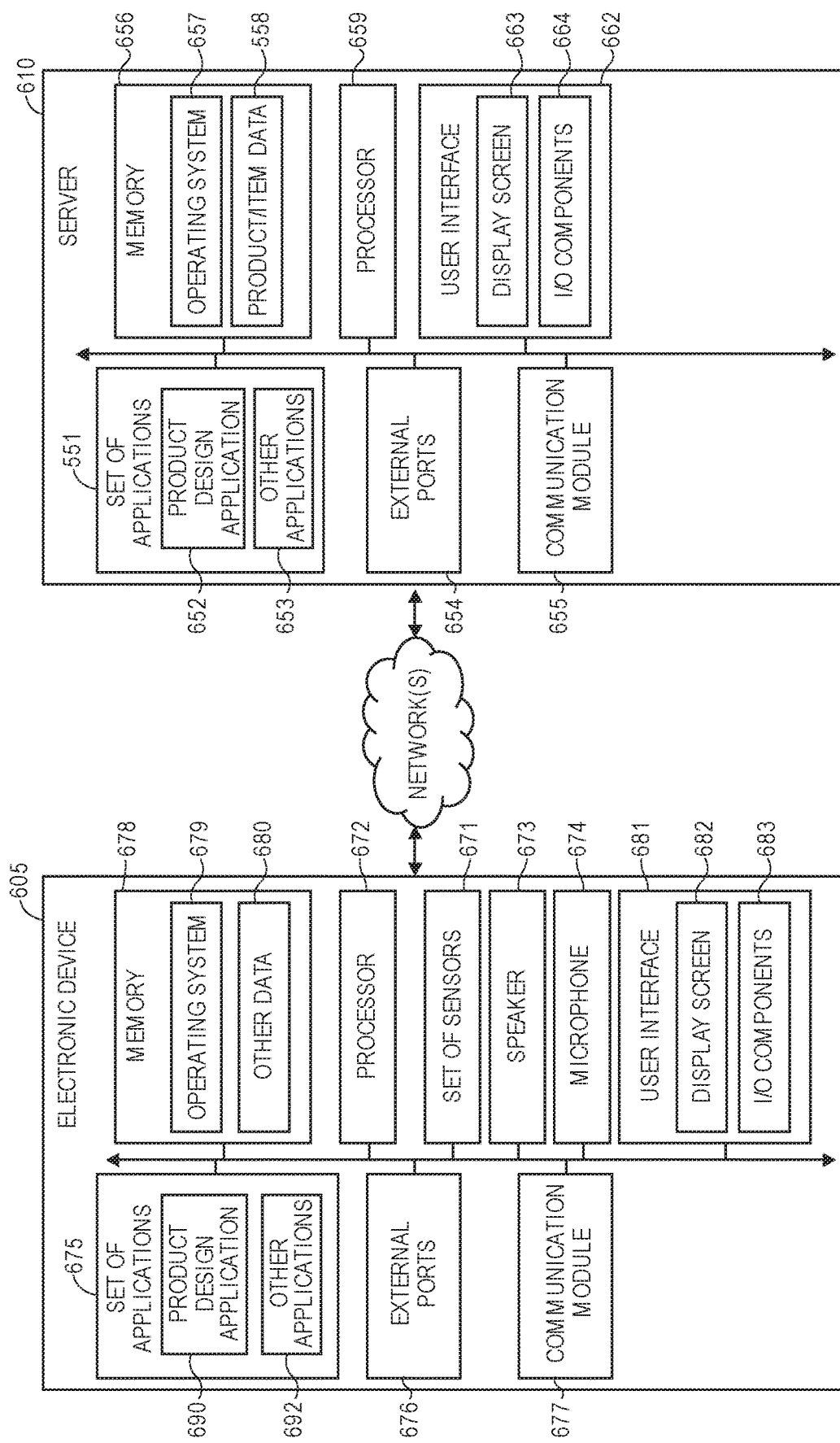
FIG. 6 is a block diagram of an example electronic device and an example server, in accordance with some embodiments.

FIG. 6 illustrates a hardware diagram of an example electronic device 605 (such as the electronic device 103 as discussed with respect to FIG. 1A) and an example server 610 (such as the central server 110 as discussed with respect to FIG. 1A), in which the functionalities as discussed herein may be implemented.

The electronic device 605 may include a processor 672 (such as the processor 156 as discussed with respect to FIG. 1B) as well as a memory 678 (such as the memory 157 as discussed with respect to FIG. 1B). The memory 678 may store an operating system 679 capable of facilitating the functionalities as discussed herein as well as a set of applications 675 (i.e., machine readable instructions). For example, one of the set of applications 675 may be an extended workspace design application 690 (such as the extended workspace design application 160 as discussed with respect to FIG. 1B) configured to facilitate certain product designing functionalities as discussed herein. It should be appreciated that one or more other applications 692, such as a web browser application for launching a web-based extended workspace design application, are envisioned.

The processor 672 may interface with the memory 678 to execute the operating system 679 and the set of applications 675. According to some embodiments, the memory 678 may also store other data 680 that may include data accessed or collected by various sensors. The memory 678 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 605 may further include a communication module 677 configured to communicate data via one or more networks 620. According to some embodiments, the communication module 677 may include one or more transceivers (e.g., WWAN, WLAN, and/or WPAN transceivers) functioning in accordance with IEEE standards, 3GPP standards, or other standards, and configured to receive and transmit data via one or more external ports 676.

The electronic device 605 may include a set of sensors 671 such as, for example, a location module (e.g., a GPS chip), an image sensor, an accelerometer, a clock, a gyroscope (i.e., an angular rate sensor), a compass, a yaw rate sensor, a tilt sensor, telematics sensors, and/or other sensors. The electronic device 605 may further include a user interface 681 (such as the user interface 153 as discussed with respect to FIG. 1A) configured to present information to a user and/or receive inputs from the user. As shown in FIG. 6, the user interface 681 may include a display screen 682 and I/O components 683 (e.g., ports, capacitive or resistive touch sensitive input panels, keys, buttons, lights, LEDs). According to some embodiments, the user may access the electronic device 605 via the user interface 681 to review information such product renderings, make design selections and modifications, and/or perform other functions. Additionally, the electronic device 605 may include a speaker 673 configured to output audio data and a microphone 674 configured to detect audio.

In some embodiments, the electronic device 605 may perform the functionalities as discussed herein as part of a "cloud" network or may otherwise communicate with other hardware or software components within the cloud to send, retrieve, or otherwise analyze data.

As illustrated in FIG. 6, the electronic device 605 may communicate and interface with the server 610 via the network(s) 620. The server 610 may include a processor 659 as well as a memory 656. The memory 656 may store an operating system 657 capable of facilitating the functionalities as discussed herein as well as a set of applications 651 (i.e., machine readable instructions). For example, one of the set of applications 651 may be an extended workspace design application 652 (such as the extended workspace design application 160 as discussed with respect to FIG. 1B) configured to facilitate various of the product design functionalities discussed herein. It should be appreciated that one or more other applications 653 are envisioned.

The processor 659 may interface with the memory 656 to execute the operating system 657 and the set of applications 651. According to some embodiments, the memory 656 may also store product/item data 658, such as data or information associated with products and items that may be offered for sale. The memory 656 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The server 610 may further include a communication module 655 configured to communicate data via the one or more networks 620. According to some embodiments, the communication module 655 may include one or more transceivers (e.g., WWAN, WLAN, and/or WPAN transceivers) functioning in accordance with IEEE standards, 3GPP standards, or other standards, and configured to receive and transmit data via one or more external ports 654. For example, the communication module 655 may receive, from the electronic device 605, requests for certain design elements.

The server 610 may further include a user interface 662 configured to present information to a user and/or receive inputs from the user. As shown in FIG. 6, the user interface 662 may include a display screen 663 and I/O components 664 (e.g., ports, capacitive or resistive touch sensitive input panels, keys, buttons, lights, LEDs). According to some embodiments, the user may access the server 610 via the user interface 662 to review information, make changes, and/or perform other functions.

In some embodiments, the server 610 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processors 672, 659 (e.g., working in connection with the respective operating systems 679, 657) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical.

What is claimed is:

1. A computer-implemented method of displaying a visual design comprising a plurality of design elements, the method comprising:
   displaying, on a computing device having a display screen, one or more designable canvases of a user interface for editing the visual design of a product, wherein the one or more designable canvases includes the plurality of design elements of the visual design;
   displaying, on the user interface, an extended workspace canvas adjacent to and at least partially surrounding the one or more designable canvases, wherein the extended workspace canvas has additional design space for temporary placement of at least one of the plurality of design elements of the visual design transferred from the one or more designable canvases; and
   in response to a surface change selection of the one or more designable canvases, maintaining the displaying of the extended workspace canvas while the one or more designable canvases are in a transitioning state.

2. The computer-implemented method of claim 1, wherein the one or more designable canvases comprises a first designable canvas and a second designable canvas, the first designable canvas configured to display a front portion of the product and the second designable canvas configured to display a back portion of the product.

3. The computer-implemented method of claim 2, wherein maintaining the displaying of the extended workspace canvas while the one or more designable canvases are in the transitioning state further comprises:
   determining at least one of the plurality of design elements displayed on the extended workspace canvas prior to the surface change selection; and
   displaying at least one of the determined plurality of design elements on the extended workspace canvas simultaneously with the first designable canvas or the second designable canvas.

4. The computer-implemented method of claim 2, wherein displaying at least one of the plurality of design elements on the extended workspace canvas simultaneously with the first designable canvas or the second designable canvas varies with actions of a user.

5. The computer-implemented method of claim 2, wherein the surface change selection causes the first designable canvas and the second designable canvas to be in the transitioning state,
   wherein upon transitioning the first designable canvas, the first designable canvas is hidden and the second designable canvas is displayed in response to the surface change selection, and
   wherein upon transitioning the second designable canvas, the second designable canvas is hidden and the first designable canvas is displayed in response to the surface change selection.

6. The computer-implemented method of claim 5, further comprising:
   displaying an animation sequence corresponding to the transitioning state between the first designable canvas and the second designable canvas.

7. The computer-implemented method of claim 3, further comprising:
   re-locating the at least one of the determined plurality of design elements to a temporary canvas;
   transitioning the first designable canvas or the second designable canvas;
   upon completion of the transitioning:
      retrieving the at least one of the determined plurality of design elements from the temporary canvas; and
      placing the at least one of the determined plurality of design elements in the extended workspace canvas.

8. A computing device for displaying a visual design comprising a plurality of design elements, comprising:
   a user interface for displaying content;
   a memory storing non-transitory computer executable instructions; and
   a processor interfacing with the user interface and the memory, wherein the processor is configured to execute the non-transitory computer executable instructions to cause the user interface to display:
      one or more designable canvases of the user interface for editing the visual design of a product, wherein the one or more designable canvases includes the plurality of design elements of the visual design, and
      an extended workspace canvas adjacent to and at least partially surrounding the one or more designable canvases,
   wherein the extended workspace canvas has additional design space for temporary placement of at least one of the plurality of design elements of the visual design transferred from the one or more designable canvases, and
   wherein the extended workspace canvas is displayed while the one or more designable canvases are in a transitioning state in response to a surface change selection of the one or more designable canvases.

9. The computing device of claim 8, wherein the one or more designable canvases comprises a first designable canvas and a second designable canvas, the first designable canvas configured to display a front portion of the product and the second designable canvas configured to display a back portion of the product.

10. The computing device of claim 9, wherein the processor causes the user interface to display the extended workspace canvas while the one or more designable canvases are in the transitioning state by:
   determining at least one of the plurality of design elements displayed on the extended workspace canvas prior to the surface change selection; and
   displaying at least one of the determined plurality of design elements on the extended workspace canvas simultaneously with the first designable canvas or the second designable canvas.

11. The computing device of claim 9, wherein displaying at least one of the plurality of design elements on the extended workspace canvas simultaneously with the first designable canvas or the second designable canvas varies with actions of a user.

12. The computing device of claim 9, wherein the surface change selection causes the first designable canvas and the second designable canvas to be in the transitioning state,
   wherein upon transitioning the first designable canvas, the first designable canvas is hidden and the second designable canvas is displayed in response to the surface change selection, and wherein upon transitioning the second designable canvas, the second designable canvas is hidden and the first designable canvas is displayed in response to the surface change selection.

13. The computing device of claim 12, wherein the processor further causes the user interface to display an animation sequence corresponding to the transitioning state between the first designable canvas and the second designable canvas.

14. The computing device of claim 10, wherein the processor, upon executing the non-transitory computer executable instructions, is further configured to:
   re-locate the at least one of the determined plurality of design elements to a temporary canvas;
   transition the first designable canvas or the second designable canvas;
   upon completion of the transition:
      retrieve the at least one of the determined plurality of design elements from the temporary canvas; and
      place the at least one of the determined plurality of design elements in the extended workspace canvas.

15. A tangible, non-transitory computer-readable medium storing executable instructions for displaying a visual design comprising a plurality of design elements that, when executed by at least one processor of a computing device, causes the computing device to:
   display one or more designable canvases of a user interface for editing the visual design of a product, wherein the one or more designable canvases includes the plurality of design elements of the visual design;
   display, on the user interface, an extended workspace canvas adjacent to and at least partially surrounding the one or more designable canvases, wherein the extended workspace canvas has additional design space for temporary placement of at least one of the plurality of design elements of the visual design transferred from the one or more designable canvases; and
   in response to a surface change selection of the one or more designable canvases, maintain the display of the extended workspace canvas while the one or more designable canvases are in a transitioning state.

16. The tangible, non-transitory computer-readable medium of claim 15, wherein the one or more designable canvases comprises a first designable canvas and a second designable canvas, the first designable canvas configured to display a front portion of the product and the second designable canvas configured to display a back portion of the product.

17. The tangible, non-transitory computer-readable medium of claim 16, wherein to maintain the display of the extended workspace canvas while the one or more designable canvases are in the transitioning state, the tangible, execution of the non-transitory computer-readable medium further causes the computing device to:
   determine at least one of the plurality of design elements displayed on the extended workspace canvas prior to the surface change selection; and
   display at least one of the determined plurality of design elements on the extended workspace canvas simultaneously with the first designable canvas or the second designable canvas.

18. The tangible, non-transitory computer-readable medium of claim 16, wherein displaying at least one of the determined plurality of design elements on the extended workspace canvas simultaneously with the first designable canvas or the second designable canvas varies with actions of a user.

19. The tangible, non-transitory computer-readable medium of claim 16, wherein the surface change selection causes the first designable canvas and the second designable canvas to be in the transitioning state,
   wherein upon transitioning the first designable canvas, the first designable canvas is hidden and the second designable canvas is displayed in response to the surface change selection, and
   wherein upon transitioning the second designable canvas, the second designable canvas is hidden and the first designable canvas is displayed in response to the surface change selection.

20. The tangible, non-transitory computer-readable medium of claim 19, wherein execution of the non-transitory computer-readable medium further causes the computing device to:
   display an animation sequence corresponding to the transitioning state between the first designable canvas and the second designable canvas.

* * * * *